Figure 1:
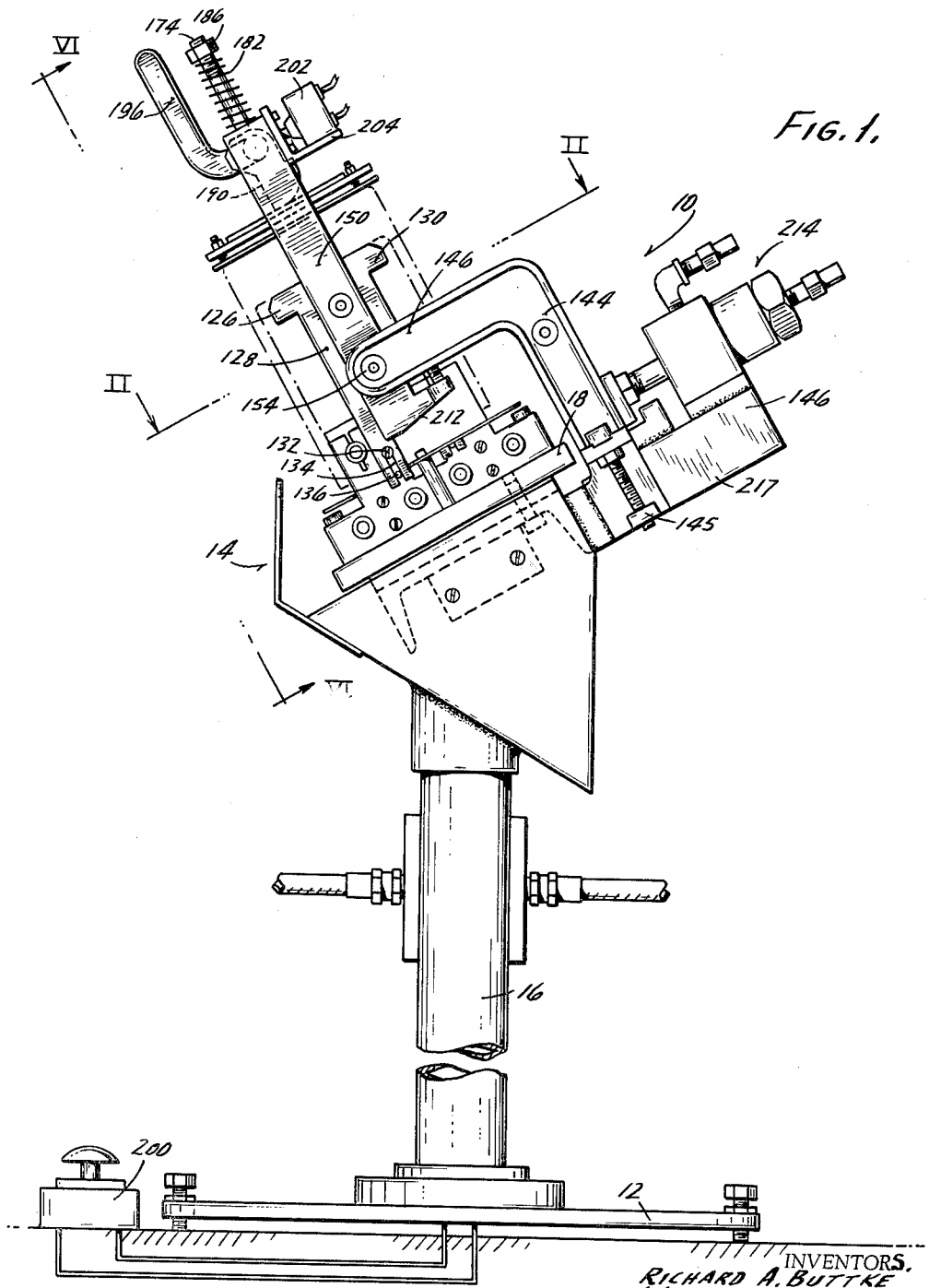

March 8, 1966 R. A. BUTTKE ETAL 3,238,829
MULTIPLE POSITIONED INTERNAL PUNCHING APPARATUS
FOR USE IN FABRICATING STORAGE BATTERY WALLS
Filed Aug. 22, 1963 4 Sheets-Sheet 1

INVENTORS.
RICHARD A. BUTTKE
WILLIAM H. BEHRENS
BY
ATTORNEY.

March 8, 1966 R. A. BUTTKE ETAL 3,238,829
MULTIPLE POSITIONED INTERNAL PUNCHING APPARATUS
FOR USE IN FABRICATING STORAGE BATTERY WALLS
Filed Aug. 22, 1963 4 Sheets-Sheet 2
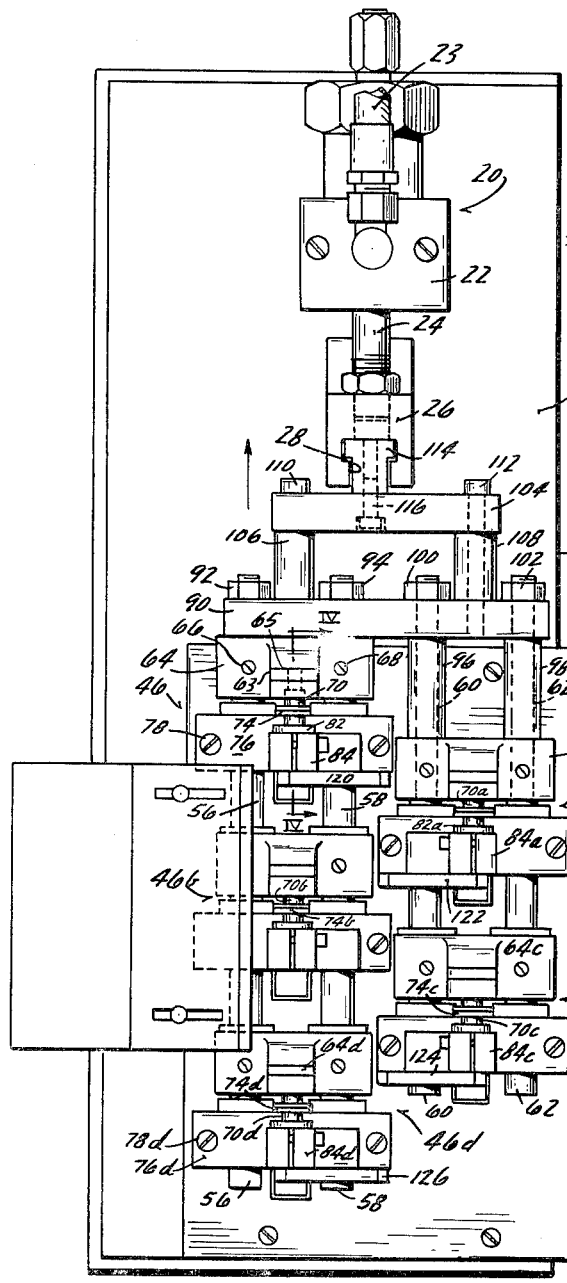
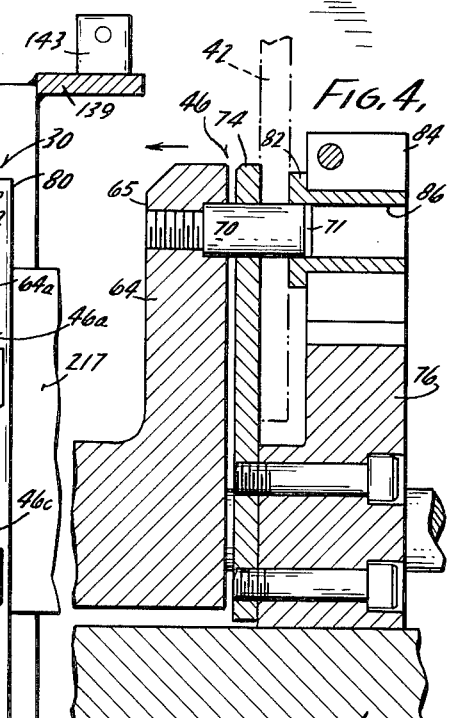
INVENTORS.
RICHARD A. BUTTKE
WILLIAM H. BEHRENS
BY
ATTORNEY.

March 8, 1966 R. A. BUTTKE ETAL 3,238,829
MULTIPLE POSITIONED INTERNAL PUNCHING APPARATUS
FOR USE IN FABRICATING STORAGE BATTERY WALLS
Filed Aug. 22, 1963 4 Sheets-Sheet 3
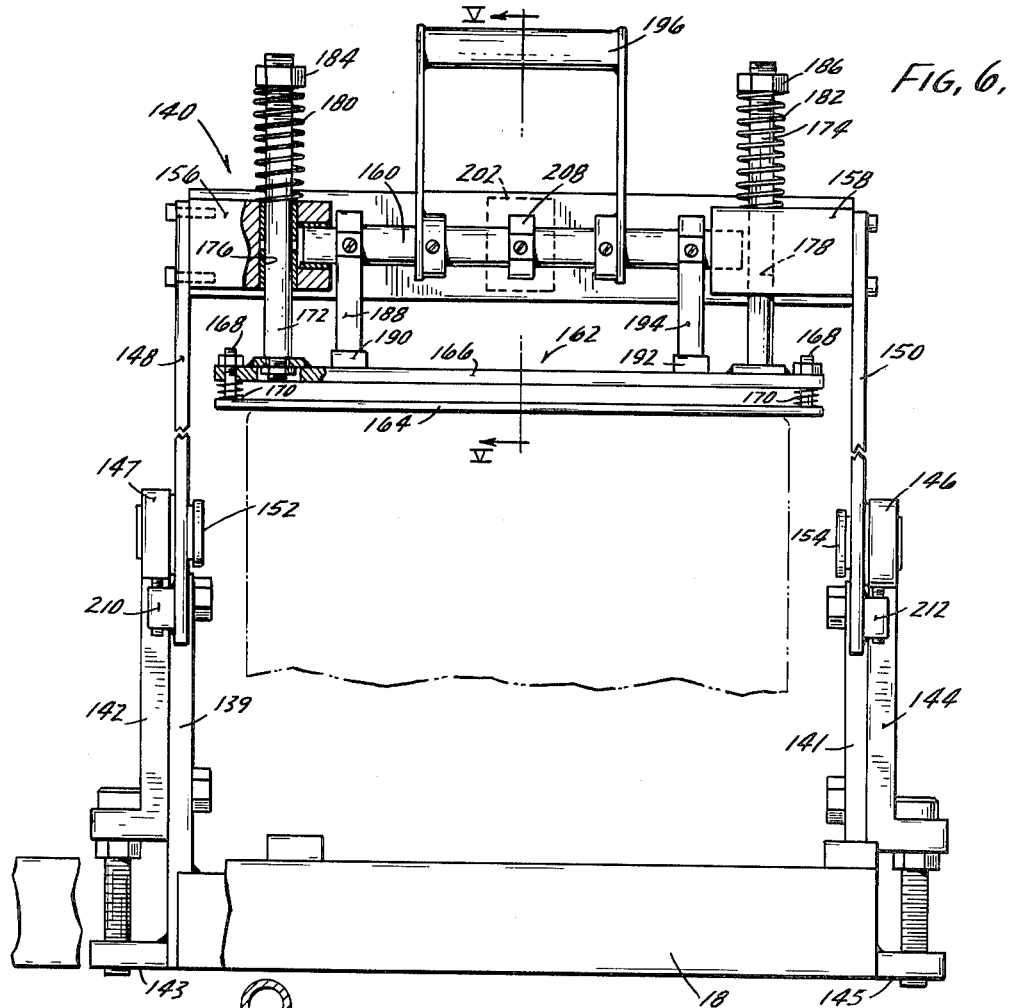
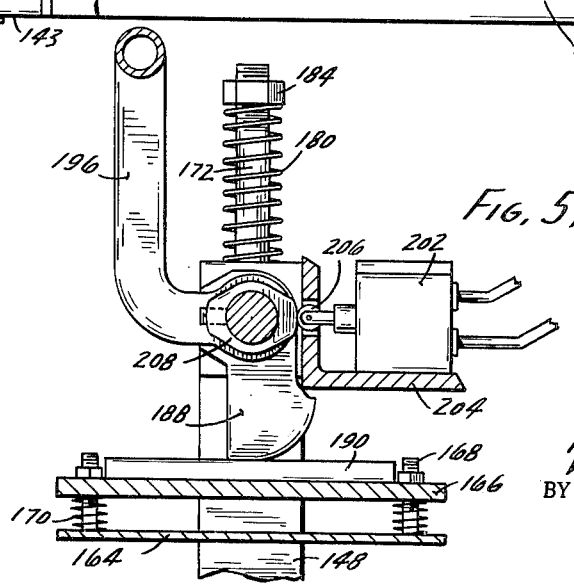
INVENTORS,
RICHARD A. BUTTKE
WILLIAM H. BEHRENS
BY
ATTORNEY.

March 8, 1966 R. A. BUTTKE ETAL 3,238,829
MULTIPLE POSITIONED INTERNAL PUNCHING APPARATUS
FOR USE IN FABRICATING STORAGE BATTERY WALLS
Filed Aug. 22, 1963 4 Sheets-Sheet 4

INVENTORS.
RICHARD A. BUTTKE
WILLIAM H. BEHRENS
BY
ATTORNEY.

United States Patent Office 3,238,829
Patented Mar. 8, 1966

3,238,829
MULTIPLE POSITIONED INTERNAL PUNCHING APPARATUS FOR USE IN FABRICATING STORAGE BATTERY WALLS
Richard A. Buttke, Milwaukee, and William H. Behrens, Racine, Wis., assignors to Globe-Union Inc., Milwaukee, Wis., a corporation of Delaware
Filed Aug. 22, 1963, Ser. No. 303,855
14 Claims. (Cl. 83—380)

This invention relates to the manufacture of storage batteries and, more particularly, to a machine adapted to accurately locate and punch openings in the partition walls of a battery case intended for use in a battery utilizing an internal intercell connection.

In manufacturing batteries having internal intercell connections, for example batteries of the type disclosed and claimed in the co-pending application of Anthony Sabatino and Daniel Orlando, for "Storage Battery Construction" filed August 1, 1962, Serial No. 214,083 and assigned to the assignee of this application, the openings in the partition walls through which the intercell connections are made must be accurately located and it is desirable that the location and formation of the openings be accomplished without requiring unduly complicated manufacturing techniques or machinery.

An object of this invention is to provide simplified and effective apparatus for accurately locating and forming openings in the battery partition walls for receipt of an intercell connection.

A further object of this invention is to provide apparatus for accurately locating and forming an intercell connection opening in the partition walls of a battery case which apparatus is not limited to use with any one particular type of battery construction.

To insure accurate location of the intercell connection openings, it has also been observed that premature operation of the apparatus for forming the openings should be prevented and, accordingly, a still further object of this invention is to insure operation of the apparatus to form the intercell openings only after the battery case has been properly positioned in the apparatus with respect to the mechanism for forming the openings.

For the achievement of these and other objects of this invention, it is proposed to provide apparatus having one or more stations in which the battery partition walls can be located, each station being provided with means for forming the intercell connection openings in the partition walls. When the case is properly located the forming mechanism is actuated. Where a plurality of partition walls and corresponding stations are provided, the openings in each of the partition walls are formed simultaneously. The apparatus in accordance with this invention also contemplates means for accurately locating the openings in the partition walls and, furthermore, a safety interlock mechanism which prevents actuation of the forming mechanism unless the battery has been properly positioned in various stations.

Moreover, it is also contemplated that the apparatus be preferably provided with more than one operating mechanism, each arranged for actuation along different axis of operation and with a releasable connection between the forming mechanism and the operating mechanisms so that the same basic apparatus can be used to form openings in batteries of different construction.

Figure 7:
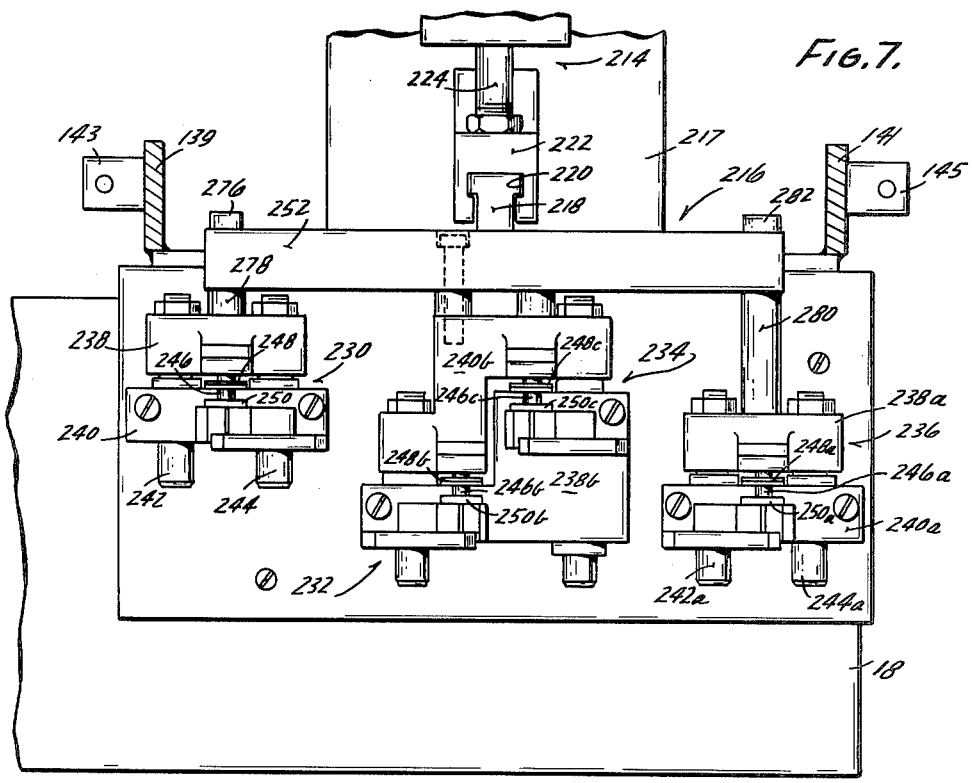

The novel features of this invention are set forth in the appended claims. The invention itself, together with additional objects and advantages thereof, will be more clearly understood from a reading of the following description in connection with the accompanying drawings wherein embodiments of the invention are illustrated and in which:

FIG. 1 is a side elevation of a preferred embodiment of this invention;
FIG. 2 is a view taken generally along line 2—2 of FIG. 1;
FIG. 3 is a partial view of a battery case of the type adapted for an internal intercell construction;
FIG. 4 is an enlarged section view generally along line 4—4 of FIG. 2;
FIG. 5 is an enlarged section view through the battery hold-down mechanism;
FIG. 6 is a front elevation of the battery hold-down mechanism; and
FIG. 7 is a top plan view of an alternative form of punch assembly usable in this apparatus.

This invention is illustrated as embodied in a punch machine 10 including a base 12 and a punch assembly 14 mounted on a support 16 extending upwardly from base 12. Punch assembly 14 includes a punch bed 18 which is positioned at an angle to the horizontal for reasons which will become apparent as this description proceeds. The punch bed is generally elongated and supports an operator assembly 20 at one of its ends. The operator assembly, which can take any suitable form, preferably comprises a double acting hydraulic cylinder 22 connected through conduit 23 to a source of hydraulic fluid (not shown). Ram 24 of the hydraulic cylinder is supported for movement in the direction of the longitudinal axis of bed 18. Ram 24 is threaded into connector block 26 to provide for some degree of adjustment therebetween and includes a T-shaped opening 28 for establishing a releasable, driving connection with a punch assembly 30 which will now be described.

It will be appreciated that other types of forming mechanisms may be used, however, the punch assembly is preferred because ot its simplicity and reliability. Before entering into a specific description of punch assembly 30, a brief description of a battery case of the type to be fabricated in this apparatus will assist in an understanding of this invention. With particular reference to FIG. 3, a battery case 32 includes opposed end walls 34, 36 and side walls 38, 40. The interior of the case 32 is divided into individual compartments by partition walls 42 extending between side walls 38, 40. It will be noted that each of the partition walls 42 is provided with an aperture 44 with the apertures of adjacent partition walls being offset from each other. This type of battery case will accommodate an internal intercell connection of the type disclosed and claimed in the above identified co-pending application of Messrs. Sabatino and Orlando.

Turning now to a description of punch assembly 30, it includes punch stations 46, 46a, 46b, 46c and 46d, i.e. a punch station for each of the partition walls 42 illustrated in FIG. 3. It will be appreciated that the number of punch stations can be increased or decreased as desired depending upon the type of battery case being processed. Guide rods 56 and 58 extend through punch stations 46, 46b and 46d and guide rods 60 and 62 extend through punch stations 46a and 46c, and are movable longitudinally of the punch bed in a manner to be described more completely hereinafter. The punch stations are identical and, for convenience, only station 46 will be described in detail and where necessary to refer to a component of the other stations it will be identified by the same number as its corresponding element in station 46 but differentiated by the appropriate letter a, b, c or d. More particularly, station 46 comprises a punch shear support block 64 suitably secured to and movable with guide rods 56 and 58, for example by set screws 66 and 68. A shear punch 70 is threaded into support block 64 and, extends through a stripper plate 74 which is fixed to die support block 76. Die support block 76 is fixed to punch plate 80 by suitable fastening means 78, 78. A generally cylindrical die 82 is supported in a split mounting block 84 carried on the die support block 76. Rods 56 and 58 extend through and are guided in suitable apertures in the die support block so that the support block provides two functions, namely a support for die 82 and a guide for rods 56 and 58 during movement between shear punch 70 and die 82. Shear punch 70 preferably includes a tool steel cutting tip 71, and is aligned with aperture 86 in die 84. As illustrated in FIG. 2 the punch assembly is in its closed position and tool steel tip 71 is positioned in die 82.

To transmit motion from the hydraulic punch operator 20 to the various punch stations, guide rods 56–62, are connected to a first actuator bar 90. More particularly, shear punch support block 64 of station 46 abuts the actuator bar 90 and nuts 92 and 94, on guide rods 56 and 58, engage its opposite face to complete a fixed connection between the guide rods 56 and 58, actuator bar 90 and shear punch support block 64. Guide rods 60 and 62 have sleeves 96 and 98 mounted thereon and extending between shear punch support block 64a of station 46a and the actuator bar 90 with nuts 100 and 102 completing a fixed connection with the actuator bar 90. With this arrangement the shear punch support block of each of the punch stations is connected for movement with guide rods 56–62 and actuator bar 90. Actuator bar 90 is connected to and movable with a second actuator bar 104 by means of sleeves 106 and 108 extending between the actuator bars and fastening means 110 and 112 extending through actuator bar 104 and sleeves 106 and 108 for connection with actuator bar 90. A T-shaped block 114 is fixedly connected to actuator bar 104 by fastening means 116 and is adapted to fit into the T-shaped notch in connector block 26 to form a dovetail-type connection between hydraulic operator assembly 20 and punch assembly 30. With this arrangement the punch assembly is releasably connected to its operator assembly for ready and facile assembly and disassembly.

As viewed in FIG. 2, the punch assembly is in its closed position. Actuation of the operator 20 will move the guide rods and the shear punch supporting blocks of each of the punch stations toward operator 20 to move the shear punches out of the dies and clear a space between strippers 74 and their respective dies. With the punch stations open an opening is defined between shear punch support block 64 and die support block 76 which extends, with respect to planar punch plate 80, in the direction of a line intersecting the plane of punch plate 80 and which opens in the direction of extension of that line so that a battery case can be moved laterally with respect to the punch assembly, particularly the planar punch plate, to position a partition wall between each stripper and die. After the battery case is properly positioned, the hydraulic operator assembly is actuated to move the shear punches away from operator 20 and form an opening through each of the partition walls. With the openings, or opening, formed the operated assembly is again activated to retract the shear punches with strippers 74 freeing the partition walls from the shear punches.

To accurately position the partition walls with respect to the shear punches and dies, punch stations 46, 46a, 46c and 46d are provided with adjustable positioning arms 120, 122, 124 and 126 respectively. As can be seen in FIG. 1, the positioning arms are generally T-shaped, each comprising a vertically extending body 128 and an end cross piece 130. Each of the positioning arms are adjustably connected to a respective one of the die support blocks, for example by screws 132 engaged in slots 134 in the positioning arm. Guide pins 136 are also engaged in the slots to insure linear motion of and proper positioning of the arms relative to the punch assembly.

The position of the cross pieces 130 can then be adjusted vertically with respect to the punch assembly to properly locate the battery partition wall ends with respect to the shear punch and die so that the intercell connection openings will be accurately located. Positioning arms 120–126 engage the inner side of the battery case bottom (see the dotted line showing of the battery case in FIG. 1) to locate the battery case vertically and, the partion walls being engaged between the stripper plates and dies, the battery case is held against longitudinal movement in the punch assembly. Vertical faces 63 and 65 of support block 64 can also be used to properly locate the battery case in the punch assembly.

In order to insure proper seating of the battery case on the punch plate, a battery hold-down assembly 140 is mounted in spaced relationship from the punch assembly by support arms 142 and 144. L-shaped support brackets 142 and 144 have one end fixedly connected relative to the punch bed 18 and their other ends 146 and 147 extending above the punch bed. More particularly, arms 142 and 144 are adjustably connected vertical brackets 139 and 141 and horizontal brackets 143 and 145, which brackets are fixed relative to the punch bed, to afford some measure of adjustment between the hold-down mechanism and the punch bed. Arms 148 and 150 are connected to support brackets 142 and 144 by pivot pins 152 and 154 for pivotal movement in the punch machine. Inwardly facing support blocks 156 and 158 are connected to the inner faces of arms 148 and 150, respectively, and a shaft 160 is journaled in and extends between the support blocks for rotational movement in the battery hold-down assembly. A battery case engaging plate assembly 162 comprises a lower plate 164 and an upper plate 166 preferably interconnected by a plurality of screws 168 extending from plate 164 through upper plate 166 and supporting compression springs 170 between the two plates so that the plates are normally biased away from each other and are capable of relative movement. Guide rods 172 and 174 are suitably fixed to upper plate 166 and extend through openings 176 and 178 in blocks 156 and 158. Rods 172 and 174 extend above the blocks and compression springs 180 and 182 are seated between respective ones of the blocks and nuts 184 and 186 engaged on the rods. With this arrangement, springs 180 and 182 exert a force on the rod biasing plate assembly 162 upwardly toward shaft 160. Shaft 160 carries a pair of cams 188 and 191 arranged to engage blocks 190 and 192 fixed to the upper face of plate 166. Cams 188 and 194 are fixed for rotation with shaft 160 and a handle 196 is provided for manipulation of the shaft in its bearings. As illustrated in the drawings, the battery hold-down assembly is in its holding position wherein plate assembly 162 is in its extreme downward position to securely clamp the battery case in the punch assembly. Movement of handle 196 to rotate shaft 160 clockwise as viewed in FIG. 1, pivots the cams 188 and 194 out of engagement with blocks 190 and 192 allowing springs 180 and 182 to move plate assembly 162 upwardly and release the battery. Support arms 148 and 150 can then be pivotel about angle supports 142 and 144 to clear the battery for removal from the apparatus.

The machine operator controls the hydraulic cylinder through a treadle 200 which activates the hydraulic cylinder to move the shear punches and form the partition wall holes. It is possible that the hydraulic cylinder could be activated before the battery case is properly seated in the punch assembly which would improperly form the openings in the partition walls. To insure against the occurrence of such premature actuation, this invention contemplates the provision of a control mechanism effective to de-energize the hydraulic cylinder until the battery hold-down mechanism has been manipulated to properly seat the battery case in the apparatus. To achieve this control function a suitable switch mechanism 202 is supported on an angle bracket 204 which is in turn connected to and extends between arms 148 and 150. Switch 202 is provided with a roller actuator 206 which extends through one of the legs of the angle bracket 204 for engagement with a cam-like actuator 208 fixed for rotation with shaft 160. Switch 202 is connected in the control circuit of treadle 200 and both are connected to control energization of the double acting hydraulic operating mechanism 20. The switch de-energizes the operating mechanism until it is operated by actuator 208, the actuator being so arranged that the switch will not be actuated unless the battery hold-down plate assembly 162 is in its extreme downward position. Therefore, the hydraulic operating mechanism cannot be actuated until the battery case is securely seated in the machine. Stops 210 and 212 are provided on the pivotal arms to limit the pivotal movement of the hold-down mechanism and will afford some degree of adjustment to insure proper positioning of the battery hold-down plate assembly 162 with respect to the punch assembly.

With punch bed 18 positioned at an angle to the horizontal and facing outwardly toward the operator, he can readily observe the various punch stations to insure that they are in proper working order, the punched waste material resulting from the punching operation will roll out of the punch assembly or is more readily cleaned out, and the battery hold-down assembly can be more easily moved to and from its operative position. Suitable stops can be provided to limit pivotal movement of the hold-down assembly from its operative position to clear the battery for removal, for example the upper edges of plates 139 and 141 can be arranged to engage arms 148 and 150.

Not all battery cases have the partition walls extending parallel to the case end walls and this invention proposes a machine which can be used to punch holes even in that type of case, e.g. in a case wherein the partition walls extend parallel to the side walls. A second hydraulic operating mechanism 214 is also provided in the machine and, with the releasable connection between the punch and operator assemblies, the punch assembly illustrated in FIG. 2 can be removed from the apparatus and a different punch assembly 216 provided. More particularly, hydraulic operator assembly 214, constructed similar to hydraulic control 20, is supported on a shelf 217. Again a releasable connection between punch assembly 216 and hydraulic operator 214 is established by a T-bar 218 engaged in T-slot 220 of a block 222 connected to hydraulic ram 224. Structurally, punch assembly 216 is similar to punch assembly 30 and includes four punch stations 230, 232, 234, and 236. Punch stations 230 and 236 are identical and include a stationary die support block 238 and 238a and a movable shear punch support block 240 and 240a. Shear support blocks 238 and 238a are connected to guide rods 242–242a and 244–244a which extend through and are movable relative to die support blocks 240 and 240a. Each station 230 and 236 also includes shear punches 246 and 246a extending through stripper plates 248 and 248a into dies 250 and 250a. Punch station 230 is connected to an actuator bar 252 by fastening means 276 and a sleeve 278 whereas punch station 236 is connected to the actuator bar by a sleeve 280 and fastening means. The fastening means fixedly engage the shear support blocks 238 and 238a to connect them for movement with the actuator bar.

Punch stations 232 and 234 are, in this embodiment, part of the same subassembly. More particularly, a single shear punch support block 240b supports the shear punches 246b and 246c of punch stations 232 and 234, respectively, and a single die supporting block 238a supports dies 250b and 250c of the punch stations. Stripper 248a and 248b are also provided in the punch stations.

The same battery hold-down assembly can be used with this embodiment as that which was described in connection with the embodiment of FIGS. 1–6 and the safety interlock control, used to eliminate the possibility of premature actuation of the punch discussed with that embodiment can also be used.

In the arrangement of FIG. 7 the motion of the punch mechanism will be normal to the longitudinal axis of the punch bed whereas that of the mechanism of FIG. 1 is parallel to the longitudinal axis. It will be appreciated, that more than two actuating mechanisms could be provided and could be positioned so that their lines of action are other than at right angles to each other.

Although this invention has been illustrated and described in connection with particular embodiments thereof, it will be apparent to those skilled in the art that various changes and modifications may be made therein without departing from the spirit of the invention or from the scope of the appended claims.

What we claim is:

1. Apparatus for use in forming openings in the walls of a storage battery case, said apparatus comprising, in combination,
   support means,
   means releasably connected to said support means and comprising a plurality of stations each including means for forming an opening in each of said walls,
   at least two actuating mechanisms mounted for connection with said stations and each differently oriented with respect to said support means to have a different line of action relative to said support means,
   and means releasably connecting said stations to a respective one of said actuating mechanisms whereby said stations can be connected to one or the other of said actuating means and assume different positions relative to said support means.

2. Apparatus for use in forming openings in the walls of a storage battery case, said apparatus comprising, in combination,
   support means,
   means releasably connected to said support means and comprising a plurality of stations mounted on said support means and including means movable to form an opening in said walls,
   first and second actuating mechanisms arranged so that their lines of action are at an angle relative to said support means and each other and operative when connected to said stations to move said forming means to form said openings,
   and means releasably connecting said stations to a respective one of said actuating mechanisms whereby said stations can be connected to one or the other of said actuating mechanisms.

3. Apparatus for use in forming openings in the walls of a storage battery case, said apparatus comprising, in combination,
   support means,
   an operating assembly releasably connected to said support means and comprising a plurality of stations mounted on said support means and each including means for forming an opening in said walls,
   and first and second actuating means connected to and supported from said support means and arranged at right angles to each other, each of said actuating means including means for releasably receiving an operating assembly so that an operating assembly can be readily connected with a respective one of said actuating means for actuation thereby and disconnected from said actuating means for removal from said apparatus.

4. Apparatus for use in forming openings in the walls of a storage battery case, said apparatus comprising, in combination,
   support means,
   an operating assembly releasably connected to said support means and comprising a plurality of stations mounted on said support means and including means for forming an opening in each of said walls,
   at least two actuating mechanisms mounted for connection with said stations and positioned in relative spaced relationship from each other and assuming different positions with respect to said support means so that said actuating mechanisms operate along different lines of action relative to said support means, means releasably connecting said operating assembly to a respective one of said actuating mechanisms whereby an operating assembly can be connected to one or the other of said actuating mechanisms and assume a different position with respect to said support means, means for positioning said battery case in said stations with said walls in predetermined relationship with said forming means, and means for controlling said first and second actuating means and connected with and controlled by said positioning means and arranged so that said actuating means is activated only when said walls are in said predetermined relationship.

5. Apparatus for use in forming openings in walls of a storage battery case, said apparatus comprising, in combination, support means, means releasably connected to said support means and comprising a plurality of stations mounted on said support means and including means for forming an opening in said walls, at least two actuating mechanisms mounted for connection with said stations and positioned in relative spaced relationship from each other and in different positions with respect to said support means so that said actuating mechanisms operate along different lines ofaction relative to said support means, means releasably connecting said stations to a respective one of said actuating mechanisms whereby stations can be connected to one or the other of said actuating mechanisms and assume a different position with respect to said support means, positioning means extending from said support means and disposed in spaced relation from said forming means for engagement with said battery case to locate said case with said walls in predetermined relationship with said forming means, battery hold-down means operatively associated with said poistioning means for engagement with said battery case to securely hold said battery case in said stations with said walls in said predetermined relationship, and control means for said actuating means connected to and controlled by said battery hold-down means and arranged so that said actuating means is activated only when said walls are in said predetermined relationship.

6. Apparatus for use in forming openings in the partition walls of a storage battery case, said apparatus comprising, in combination, support means, means releasably connected to said support means and comprising a plurality of stations mounted on said support means and including movable means for forming an opening in each of said walls, first and second actuating mechanisms disposed at an angle to each other and operative when connected to said stations to move said forming means to form said opening, means releasably connecting said stations to a respective one of said actuating mechanisms whereby said stations can be connected to one or the other of said actuating means and assume a different position with respect to said support means, means for positioning said battery case in said station with said walls in predetermined relationship with said forming means and including battery hold-down means arranged to engage and securely hold said battery case in said stations with said walls in said predetermined relationship, and control means for said actuating means connected to and controlled by said battery hold-down means and arranged so that said actuating means is activated only when said walls are in said predetermined position.

7. Apparatus for use in punching openings in the partition walls of a storage battery case, said apparatus comprising, in combination, support means, an operating assembly releasably connected to said support means and comprising a plurality of punch stations each including relatively movable punch shear and die mechanisms, first and second actuating means connected to and supported from said support means and arranged at right angles to each other, each of said actuating means including means for releasably receiving an operating assembly so that an operating assembly is readily connected with a respective one of said actuating means for actuation thereby and disconnected from said actuating means for removal from said apparatus, positioning means extending from said support means and disposed in spaced relation from said punch means for engagement with said battery case to locate said case in said punch stations, with said walls in predetermined relationship with said shear and die, battery hold-down means supported adjacent said positioning means for engagement with said battery case to securely hold said battery case in said stations with said walls in said predetermined relationship, and control means for said actuating means connected to and controlled by said battery hold-down means and arranged so that said actuating means is activated only when said walls are in said predetermined position.

8. The apparatus of claim 7 wherein said hold-down means comprises at least one arm supported for pivotal movement relative to said support means, battery case engaging means supported on said arm and arranged for engagment with said battery case, and cam means supported for pivotal movement relative to said arms and arranged to engage and clamp said case engaging means against said case.

9. The apparatus of claim 8 wherein said control means includes switch means in the control circuit for said actuating means and arranged for engagement with and actuation by said cam means so that said punch stations are actuated only when said battery walls are in said predetermined position.

10. Apparatus for use in forming openings in the walls of a storage battery case, said apparatus comprising, in combination, support means defining a generally planar face, a plurality of stations connected to and relatively spaced across said planar face in a direction parallel to said planar face, each of said stations including first and second relatively movable forming mmebers having a first position in relative spaced relationship to define a space therebetween extending from said face in the direction of a line intersecting the plane of said face, said spaces opening in the direction of the extension of said line to permit receipt of a partition wall in the space at each of said stations by moving said partition wall parallel to said line, actuating means connected to and operative to effect simultaneous relative movement between the first and second members of each of said stations toward each other to form openings in partition walls disposed in said spaces, positioning means connected to said support means and arranged to engage said battery case and operative to position said partition walls in predetermined relationship with said first and second members, and means for controlling said actuating means and connected with and controlled by said positioning means and aranged so that said actuating means is activated only when said partition walls are in said predetermined relationship.

11. Apparatus for use in forming openings in the partition walls of a storage battery case, said appartus comprising, in combination, means defining a support surface, a plurality of stations each including first and second relatively movable forming members connected to said support surface and extending outwardly from their points of connection to said support surface and terminating in end portions which are spaced outwardly of said support surface, the first and second members of each of said stations having a first position in relative spaced relation with said end portions thereof relatively spaced to define a space between the first and second forming members at each of said stations which extends along a line intersecting said surface and opens in the direction of extension of said line and to permit receipt of a partition wall in the space at each of said stations by moving said partition wall parallel to said line, actuating means connected to and operative to effect simultaneous relative movement between the first and second members of each of said stations to form openings in partition walls disposed in said spaces, means connected to said support means for positioning said battery case relative to said stations with the partition walls thereof in predetermined relationship with said first and second forming members and including battery hold-down means arranged to engage and securely hold said battery case in said stations with said partition walls in said predetermined relationship, and control means for said actuating means connected to and controlled by said battery hold-down means and arranged so that said actuating means is actuated only when said partition walls are in said predetermined relationship.

12. Apparatus for use in forming openings in the walls of a storage battery case, said apparatus comprising, in combination, generally planar support means, a plurality of stations connected to said support means and each including relatively movable punch shear and die members having a first position in relative spaced relationship defining a space therebetween extending from and opening perpendicularly from said support means so that a partition wall can be moved perpendicularly with respect to said support means into and out of the space at each of said stations, actuating means connected to and operative to effect simultaneous relative movement between said punch shear and die members toward each other to form openings in said partition walls disposed in said spaces, and means connected to said support means and operative to engage and position said battery case with respect to said stations with said walls in predetermined relationship with said punch shear and die members.

13. The combination of claim 12 wherein said positioning means comprise at least two relatively spaced positioning members extending perpendicularly from said support means to engage and position said battery case with respect to said stations.

14. The apparatus of claim 12 including means connecting said stations to said support means with adjacent ones of said stations offset from each other and with alternate stations being aligned on parallel, relatively spaced lines.

References Cited by the Examiner

UNITED STATES PATENTS

| | | | |
|---|---|---|---|
| 1,297,539 | 3/1919 | Bull | 269—236 |
| 2,539,902 | 1/1951 | Foley | 83—381 |
| 2,742,086 | 4/1956 | Reid | 83—181 |
| 2,843,205 | 7/1958 | Greulich | 83—452 |
| 2,942,059 | 6/1960 | Doyle et al. | 136—176 |
| 3,034,778 | 5/1962 | Shaffer et al. | 269—157 |

WILLIAM W. DYER, JR., *Primary Examiner.*

ANDREW R. JUHASZ, LEON PEAR, *Examiners.*